United States Patent [19]

Doumoto et al.

[11] Patent Number: 4,898,094

[45] Date of Patent: Feb. 6, 1990

[54] APPARATUS AND METHOD FOR CONTROLLING A PLURALITY OF CONTINUOUS PAPER PRINTING MACHINES CONNECTED TO EACH OTHER

[75] Inventors: Hideki Doumoto; Takashi Kimura, both of Hiroshima, Japan

[73] Assignee: Ryobi Ltd., Hiroshima, Japan

[21] Appl. No.: 297,285

[22] Filed: Jan. 17, 1989

[30] Foreign Application Priority Data

Jan. 15, 1988 [JP] Japan .............................. 63-7297/88

[51] Int. Cl.⁴ ......................... B41F 1/34; G06F 15/46

[52] U.S. Cl. .................................... 101/485; 101/248; 101/181; 364/469; 226/4; 226/29; 226/111

[58] Field of Search ............... 101/248, 485, 181, 228; 364/469; 226/28, 29, 30, 111, 4, 27

[56] References Cited

U.S. PATENT DOCUMENTS

| | | | |
|---|---|---|---|
| 3,525,858 | 8/1970 | Thiede et al. | 226/28 |
| 3,601,587 | 8/1971 | Thiede | 226/28 |
| 4,318,176 | 3/1982 | Stratton et al. | 364/469 |
| 4,539,907 | 9/1985 | Johne et al. | 101/248 |
| 4,541,335 | 9/1985 | Tokuno et al. | 101/181 |
| 4,552,066 | 11/1985 | Giori et al. | 101/248 |
| 4,570,916 | 2/1986 | Thompson | 226/4 |
| 4,648,540 | 3/1987 | Steidel | 226/29 |
| 4,719,575 | 1/1988 | Gnuethtel et al. | 364/469 |
| 4,757,930 | 7/1988 | Ditto | 226/29 |
| 4,781,317 | 11/1988 | Ditto | 226/29 |
| 4,805,111 | 2/1989 | Steidel | 101/248 |
| 4,839,814 | 6/1989 | Steidel | 364/469 |

*Primary Examiner*—Eugene H. Eickholt
*Attorney, Agent, or Firm*—Finnegan, Henderson, Farabow, Garrett and Dunner

[57] ABSTRACT

An apparatus and method for controlling a plurality of connected continuous paper printing machines connected in series prevent difference in rotational speeds of the connected printing machines from causing the paper between the printing machines from piling up or tearing. Signal generators count the number of sheets of continuous paper entering each printing machine. The difference in the number of sheets entering each printing machine is calculated and compared to preset upper and lower limits. If an upstream printing machine turns faster than a downstream printing machine, slack will develop in the paper between the printing machines, and the difference between the sheets entering the upstream printing machine and sheets entering the downstream printing machine will be a (+) value. When a preset upper limit is reached, a controller will temporarily stop the upstream printing machine until the downstream printing machine takes up all the slack. Similarly, if the downstream printing machine turns faster than the upstream printing machine, paper between the printing machines will become taut, and the difference between sheets entering the upstream printing machine and sheets entering the downstream printing machine will be a (−) value. When a preset lower limit is reached, another controller will temporarily stop the downstream printing machine until the tautness is relieved.

8 Claims, 4 Drawing Sheets

APPARATUS AND METHOD FOR CONTROLLING A PLURALITY OF CONTINUOUS PAPER PRINTING MACHINES CONNECTED TO EACH OTHER

BACKGROUND OF THE INVENTION

1. Field of the Invention

The present invention relates to an apparatus and a method for controlling a plurality of continuous paper printing machines, number printing machines or the like, which are connected to each other in series, and have individual motive power sources.

2. Description of the Related Art

Continuous paper printing machines, which are connected to each other in series in a printing process and have individual motive power sources, must rotate at the same speed. If the rotational speed of an upstream continuous paper printing machine is higher than that of a downstream continuous paper printing machine, slack will appear in the continuous printing paper web between the printing machines and will increase until the paper overflows between them. If the rotational speed of the upstream printing machine is lower than that of the downstream printing machine, the tension of the paper between the printing machines will increase until the paper tears. In the prior art, the rotational speeds of the continuous paper printing machines have been made equal to each other by using an electric motor or the like. However, since use of a motor or the like is expensive, the cost of the printing machines and that of printing are increased.

SUMMARY OF THE INVENTION

An object of the present invention is to provide an apparatus for controlling a plurality of continuous paper printing machines connected to each other in series, having individual motive power sources.

Another object of the present invention is to provide an apparatus for controlling a plurality of continuous paper printing such that even if the rotational speeds of the respective printing machines are different from each other the continuous paper web will not sag beyond necessity or be torn between the printing machines.

These and other objects are attained by an apparatus for controlling a plurality of paper printing machines connected in series for printing on a continuous paper web segmented linearly into frames comprising a first signal generating means for generating a first frame signal every time a sheet of the paper is fed into a first of the printing machines, a second signal generating means for generating a second frame signal every time a sheet of the paper is fed into a second of the printing machines, a difference calculation means for receiving the first frame signals and the second frame signals and for calculating a frame difference value corresponding to the difference between the number of the first frame signals and the second frame signals, comparison means for comparing the frame difference value with an upper limit value and a lower limit value, and control means for controlling the feeding of paper to the first printing machine to temporarily stop the feed of the paper to the first printing machine when the frame difference value is larger than the upper limit value and for controlling the feeding of paper to the second printing machine to temporarily stop the feed of the paper to the second printing machine when the frame difference value is smaller than the lower limit value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

In the present invention, the continuous paper printing machines have individual motive power sources and can be connected to each other so as to operate jointly, even though the rotational speeds thereof remain unequal to each other. Therefore, the apparatus is much simpler than a conventional apparatus by which the rotational speeds of paper printing machines connected to each other in series are made equal to each other. For that reason, the cost of the apparatus provided in accordance with the present invention is reduced. Further, the printing machines equipped with the apparatus can be optionally and easily disconnected from each other to operate independently of each other and to perform different kinds of printing.

While the printing machines are connected to each other to operate jointly, polychrome printing, a combination of offset printing and number printing or the like, can be sequentially performed on the continuous paper by the printing machines. In that case, if the paper is set with a first side up on one of the printing machines and set with the first side down on another printing machine, the printing or the like can be performed on both sides of the paper.

An embodiment of the present invention is hereafter described in detail with reference to the drawings attached hereto.

Figure 2:
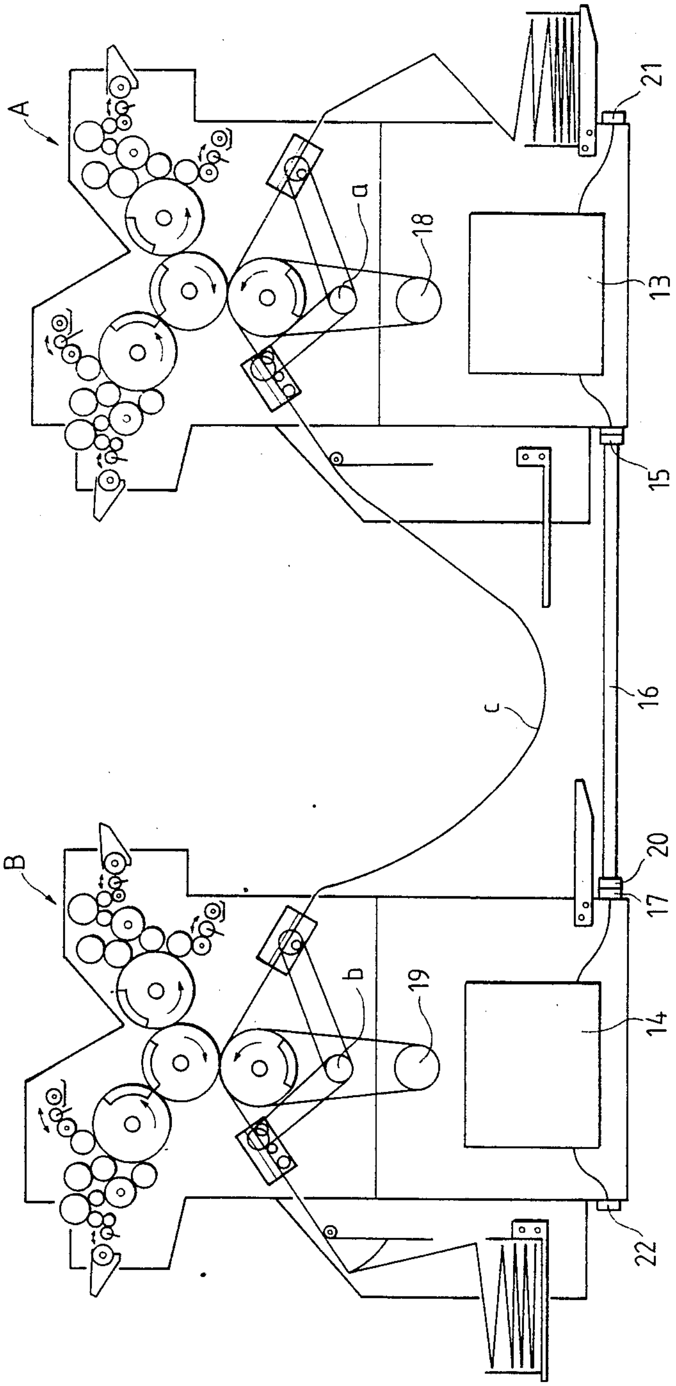
FIG. 2 shows a schematic view of the apparatus and the dichromatic printing machines.
Figure 3:
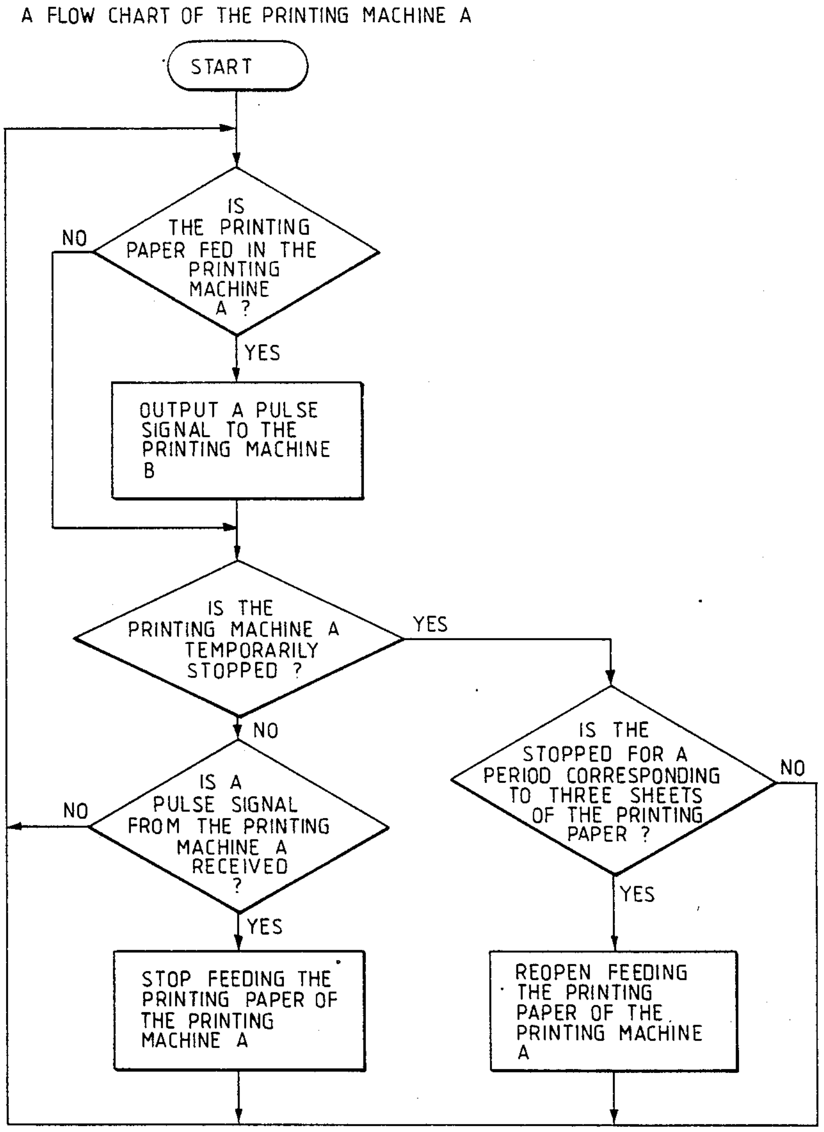
FIG. 3 is a flow chart of the operation of one of the dichromatic printing machines.
Figure 4:
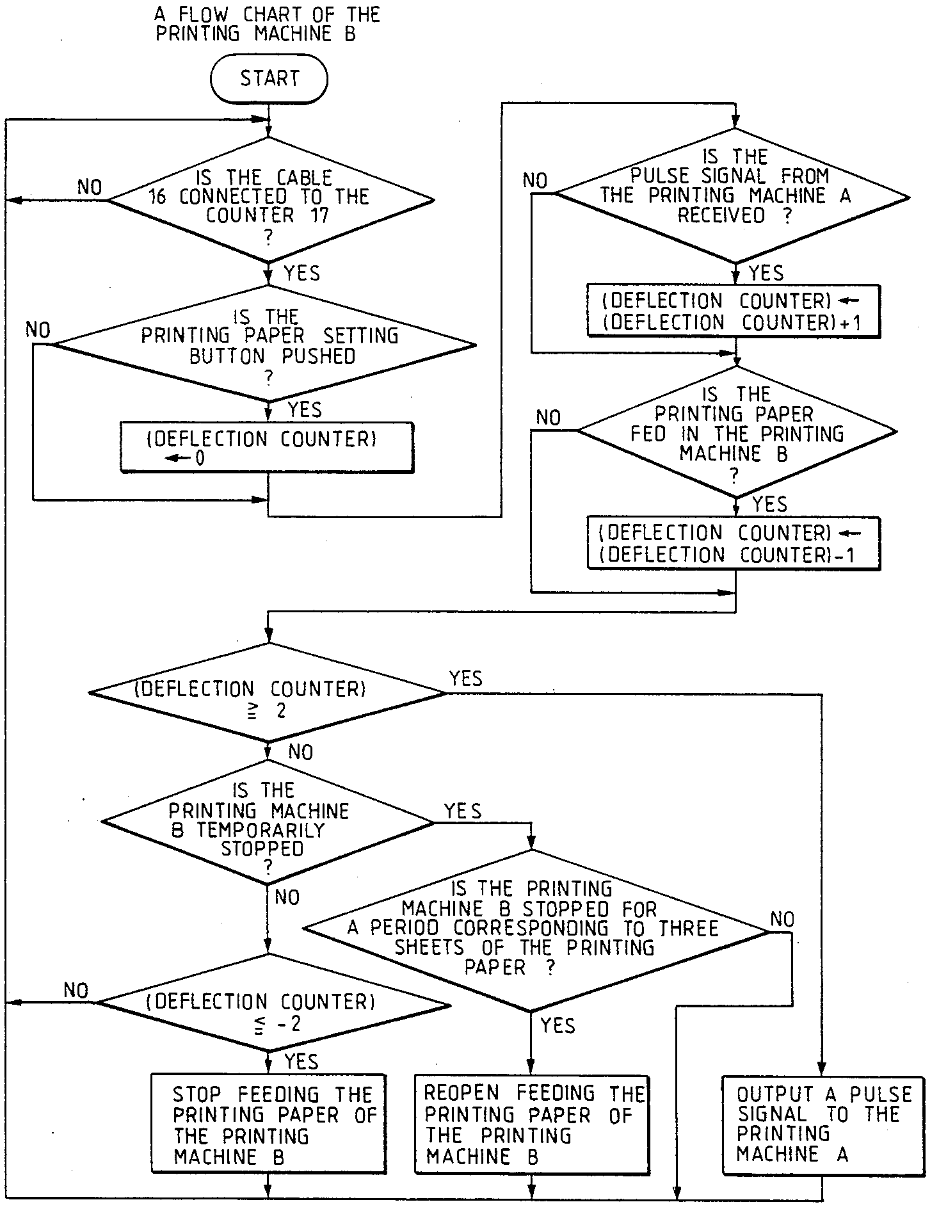
FIG. 4 is a flow chart of the operation of the other of the dichromatic printing machines.

FIG. 2 shows a first dichromatic printing machine A in the upstream stage of a printing process and a second dichromatic printing machine B in the downstream stage of the process. The printing machines A and B are connected to each other in series to perform printing in four colors on continuous printing paper C. The printing machines A and B have motive power sources 18 and 19, respectively, so that each of the printing machines can operate alone for dichromatic printing.

Figure 1:
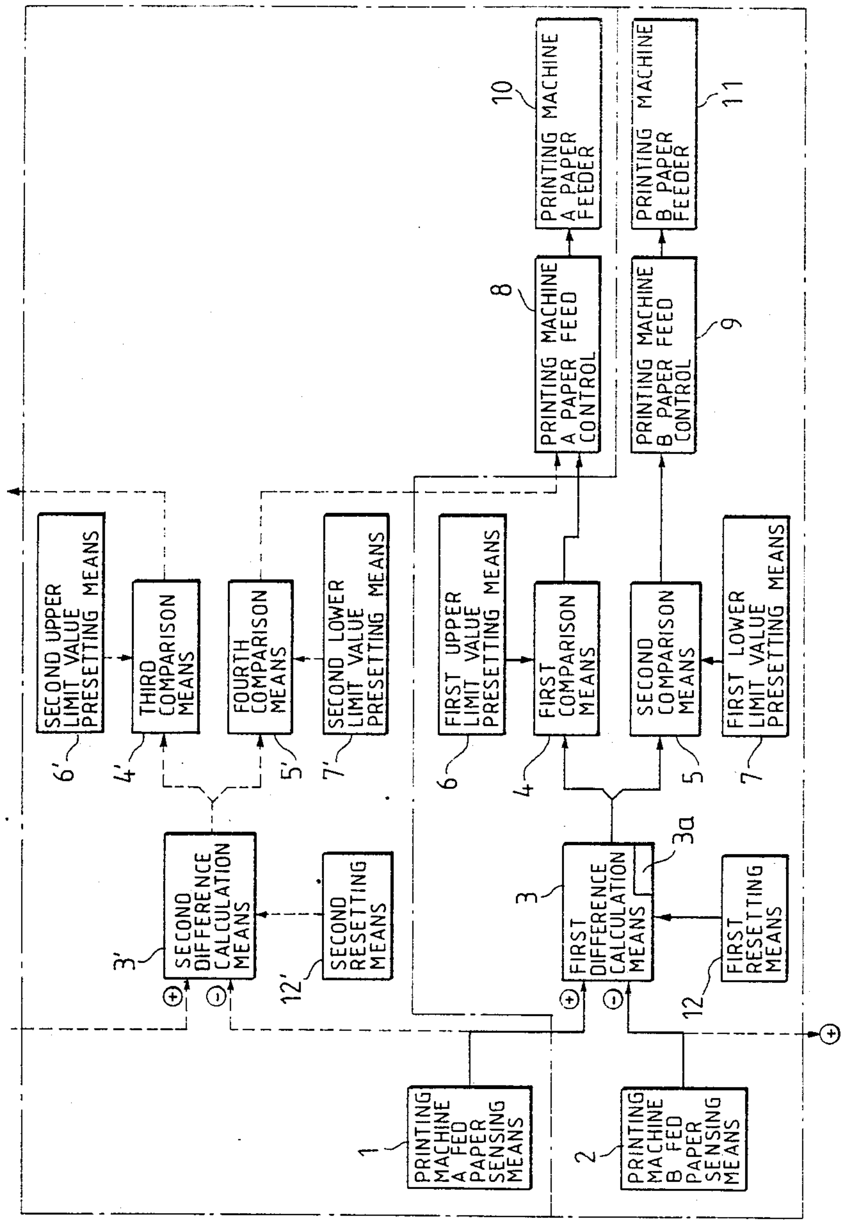
FIG. 1 shows a functional block diagram of an embodiment of the present invention which includes dichromatic printing machines connected to each other in series.

Referring to FIG. 1, an apparatus according to the present invention controls the series dichromatic printing machines A and B including a printing machine A paper frame sensor 1 for generating a pulse every time a sheet of the printing paper C is fed into the first printing machine A. A printing machine B paper frame sensor 2 generates a pulse every time a sheet of the paper C is fed into the second printing machine B. A first difference calculation means 3 calculates the difference between the numbers of the pulses generated by the paper frame sensors 1 and 2. When a pulse generated by the printing machine A paper frame sensor 1 is entered into the first difference calculation means 3, the count of a first counter 3a of the first difference calculation means 3 is increased by one. When a pulse generated by the printing machine B paper frame sensor 2 is entered into the first difference calculation means 3, the count of the counter 3a is decreased by one.

The apparatus also includes a first resetting means 12 for resetting the count of the counter 3a of the first difference calculation means 3 to zero when the printing paper C is set into the printing machines A and B. A first upper limit value presetting means 6 and a first lower limit value presetting means 7 are provided for presetting an upper and a lower limit value, respectively, with which the count of the counter 3a is compared by first and second comparison means 4 and 5, respectively.

The first comparison means 4 is connected to a printing machine A paper feed control means 8 for the printing machine A. When the count of the counter 3a has become larger than the upper limit value preset by the first upper limit value presetting means 6 a signal for temporarily stopping the feed of paper C in printing machine A is entered into the printing machine A paper feed control means 8, and the printing machine A paper feeder 10 of the printing machine A is temporarily stopped by the printing machine A paper feed control means 8.

The second comparison means 5 is connected to a printing machine B paper feed control means 9 for the printing machine B. A signal for temporarily stopping the feed of the paper C in the printing machine B when the count of the counter 3a is determined by the second comparison means 5 to be smaller than the lower limit value preset by the first lower limit value presetting means 7 is provided by the printing machine B paper feed control 9 to the printing machine B paper feeder 11 of the printing machine B to temporarily stop paper feed. The upper and the lower limit values, which are preset by the first upper and the first lower limit value presetting means 6 and 7, are determined depending on the number of the frames of the portion of the printing paper C which are to sag between the printing machines A and B. The upper and the lower limit values may be either preset as inherent values for the printing machines A and B, or preset from outside by digital switches or the like.

The operation of the apparatus is described in detail below with reference made to FIGS. 1, 2, 3 and 4. The dichromatic printing machines A and B are regulated by microcomputers 13 and 14, respectively, to start or stop the rotation of the printing machines, and start or stop the feed of the printing paper C by the paper feed motors a and b. The printing machine A paper frame sensor first signal generating means 1 is provided in the microcomputer 13 of the printing machine A to generate the pulse and send it out to the first difference calculating means 3 in the microcomputer 14 of the other printing machine B every time one sheet of the printing paper C is fed in the printing machine A. When the pulse is entered into the first difference calculation means 3, the count of the counter 3a of the first difference calculation means is increased by one.

The printing machine B paper frame sensor 2 is provided in the microcomputer 14 of the printing machine B to generate a pulse for each paper frame and to send the pulse to the first difference calculating means 3 to decrease the count of the counter 3a by one every time one sheet of the printing paper C is fed in the printing machine B. The first comparison means 4 is provided in the microcomputer 14 of the printing machine B to check whether or not the count of the counter 3a of the first difference calculating means 3 has become larger than the upper limit value, e.g., +2, preset by the first upper limit presetting means 6.

The second comparison means 5 is provided in the microcomputer 14 of the printing machine B to check whether or not the count of the counter 3a of the first difference calculating means 3 has become smaller than the lower limit value, e.g., −2, preset by the first lower limit presetting means 7. If the count has become smaller than the lower limit value of −2, the second comparison means 5 sends out a pulse signal to the printing machine B paper feed control means 9 to stop the paper feed motor b of the printing machine B paper feeder 11 of the printing machine B for a period corresponding to three sheets of the printing paper C. If the count has become larger than the upper limit value of +2, the first comparison means 4 sends out a pulse signal to the printing machine A paper feed control means 8 in the microcomputer 13 of the printing machine A through the connector 17, the cable 16 and the connector 15 to stop the paper feed motor a of the printing machine A paper feeder 10 of the printing machine A for a period corresponding to three sheets of the printing paper C.

When a printing paper setting button provided as the first resetting means 12 in the printing machine B is pressed, the count of the counter 3a of the first difference calculating means 3 in the microcomputer 14 of the printing machine B is reset to zero. The printing paper C is set on the printing machines A and B in advance so that the paper sags by two or more frames between the printing machines. As a result, even if the rotational speeds of the individual motive power sources 18 and 19 of the printing machines A and B are not equal to each other, the printing machines operate in series with each other without sagging or tearing of the printing paper C.

A short-circuit line 20 is attached to the cable 16 at the connector 17 so that a connection signal indicating whether or not the cable 16 is inserted in the connector 17 is entered into the microcomputer 14 of the printing machine B. When the microcomputer 14 has received a connection signal indicating that the cable 16 is not inserted in the connector 17, the microcomputer 14 controls the paper feed motor b independently of the pulse sent from the printing machine A every time one sheet of the printing paper C is fed therein. For that reason, the printing machines A and B can be caused to operate independently of each other, if the cable 16 is disconnected from the connector 17.

The printing machine A is provided with a connector 21 through which the printing machine can be connected to another printing machine installed upstream of the printing machine A but not shown in the drawings. The printing machine B is provided with a connector 22 through which the printing machine can be connected to yet another printing machine installed downstream of the printing machine B but not shown in the drawings. The relation between the printing machine A and another printing machine installed upstream thereto and the relation between the printing machine B and another printing machine installed downstream thereto is the same as that between the printing machines A and B.

Yet another printing machine can be installed between the printing machines A and B and connected in series thereto in the same manner as the printing machines A and B are connected to each other. The printing machine installed between the printing machines A and B can be provided with a second difference calculating means 3', third and fourth comparison means 4' and 5', a second upper limit value presetting means 6', a second lower limit value presetting means 7', and a second resetting means 12' which are connected to each other in the same manner as corresponding elements of the printing machines A and B, as shown in FIG. 1.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of applicants'invention as set forth in the appended claims.

What is claimed is:

1. A method for controlling a plurality of paper printing machines connected in series for printing on a continuous paper web segmented linearly into frames, each of the printing machines having individual motive power sources, the method comprising the steps of:

generating a first signal every time one sheet of continuous paper is fed into a first one of said printing machines;

generating a second signal every time one sheet of said continuous paper is fed into a second one of said printing machines;

calculating a frame difference signal indicating the difference between the number of said first signals generated and the number of said second signals generated;

comparing said frame difference value with an upper limit value and a lower limit value;

controlling the feed of paper to the first printing machine to temporarily stop the feed of the paper to the first printing machine when said frame difference value is larger than the upper limit value; and controlling the feed of paper to the second printing machine to temporarily stop the feed of the paper to the second printing machine when said frame difference value is smaller than the lower limit value.

2. The method of claim 1, further including the steps of:

resetting said frame difference value when the paper is set in the first and second printing machines;

presetting the upper limit value; and presetting the lower limit value.

3. An apparatus for controlling continuous paper feed between at least a first and second paper printing machines connected in series for printing on a continuous paper web segmented linearly into frames, each of the printing machines having individual motive power sources, the apparatus comprising:

a first signal generating means for generating a first frame signal every time a sheet of the paper web is fed into said first printing machine;

a second signal generating means for generating a second frame signal every time a sheet of the paper web is fed into said second printing machine;

a difference calculation means for receiving said first frame signal and said second frame signal and for calculating a frame difference value corresponding to the difference between said first frame signal and said second frame signal;

comparison means for comparing said frame difference value with an upper limit value and a lower limit value;

a first paper feeding means for feeding the paper web to the first printing machine;

a second paper feeding means, operating independently of said first paper feeding means, for feeding the paper web to the second printing machine;

a first control means for controlling said first paper feed means to temporarily stop the feed of the paper web in the first printing machine when said frame difference value is larger than said upper limit value; and a second control means for controlling said second paper feed means to temporarily stop the feed of the paper web in the second printing machine when said frame difference value is less than said lower limit value.

4. An apparatus according to claim 3, further including resetting means for resetting said difference calculation means to an initial value when paper is set into the first and second printing machines.

5. An apparatus according to claim 3, further including a lower limit value presetting means for presetting the lower limit value.

6. An apparatus according to claim 3, further including an upper limit value presetting means for presetting the upper limit value.

7. An apparatus according to claim 3, wherein said comparison means comprises:

a first comparison means for comparing said frame difference value with said upper limit value; and a second comparison means for comparing said frame difference value with said lower limit value.

8. The apparatus of claim 3, further comprising:

a first connecting means, disposed in the first printing machine, for connecting said first printing machine to a further printing machine in series; and a second connecting means, disposed in the second printing machine, for connecting said second printing machine to a further printing machine in series.

* * * * *

UNITED STATES PATENT AND TRADEMARK OFFICE

CERTIFICATE OF CORRECTION

PATENT NO. : 4,898,094

DATED : February 06, 1990

INVENTOR(S) : Hideki Doumoto et al.

It is certified that error appears in the above-identified patent and that said Letters Patent is hereby corrected as shown below:

In the Abstract, Line 3, "difference" should be --differences--;

Claim 6, Column 6, Line 45, "claim 3" should be --claim 5--.

Signed and Sealed this

Twenty-seventh Day of October, 1992

Attest:

DOUGLAS B. COMER

*Attesting Officer*

*Acting Commissioner of Patents and Trademarks*